United States Patent
Anan et al.

(10) Patent No.: US 10,182,113 B2
(45) Date of Patent: Jan. 15, 2019

(54) STREAM DATA PROCESSING SYSTEM AND PROCESSING METHOD

(71) Applicant: Hitachi, Ltd., Tokyo (JP)

(72) Inventors: Satoru Anan, Tokyo (JP); Yusuke Atomori, Tokyo (JP); Takahiro Hamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 15/122,808

(22) PCT Filed: Sep. 2, 2014

(86) PCT No.: PCT/JP2014/072974
§ 371 (c)(1),
(2) Date: Aug. 31, 2016

(87) PCT Pub. No.: WO2016/035128
PCT Pub. Date: Mar. 10, 2016

(65) Prior Publication Data
US 2017/0070572 A1    Mar. 9, 2017

(51) Int. Cl.
*H04L 29/08* (2006.01)
*G06F 9/50* (2006.01)
*G06F 17/30* (2006.01)
*H04L 12/26* (2006.01)

(52) U.S. Cl.
CPC ........... *H04L 67/1097* (2013.01); *G06F 9/50* (2013.01); *G06F 17/30864* (2013.01); *H04L 43/16* (2013.01); *H04L 67/1095* (2013.01)

(58) Field of Classification Search
CPC .............. G06F 17/30864; H04L 43/16; H04L 67/1095; H04L 67/1097
See application file for complete search history.

(56) References Cited

U.S. PATENT DOCUMENTS

2010/0153363 A1    6/2010    Suzuki et al.

FOREIGN PATENT DOCUMENTS

JP    2010-140357 A    6/2010

OTHER PUBLICATIONS

International Search Report of PCT/JP2014/072974 dated Oct. 7, 2014.

*Primary Examiner* — Chirag R Patel
(74) *Attorney, Agent, or Firm* — Mattingly & Malur, PC

(57) ABSTRACT

The stream data processing system has an input server which accumulates input stream data to be migrated, instructs a migration source and a migration destination to perform data migration, transfers accumulated data to the migration destination in response to an accumulated data transfer instruction, then stops transferring data to the migration source, and transfers subsequent data to the migration destination subsequently to the transfer of the accumulated data. The migration source migrates both a query and an intermediate value that has been produced as a result of completion of execution of the query on input data. A migration destination server reads the accumulated data and the subsequent data that are transferred from the input server, skips reading the portions of these transferred data corresponding to and preceding the migrated intermediate value, and discards the output that is transferred from the migration source and precedes the query execution results.

12 Claims, 11 Drawing Sheets

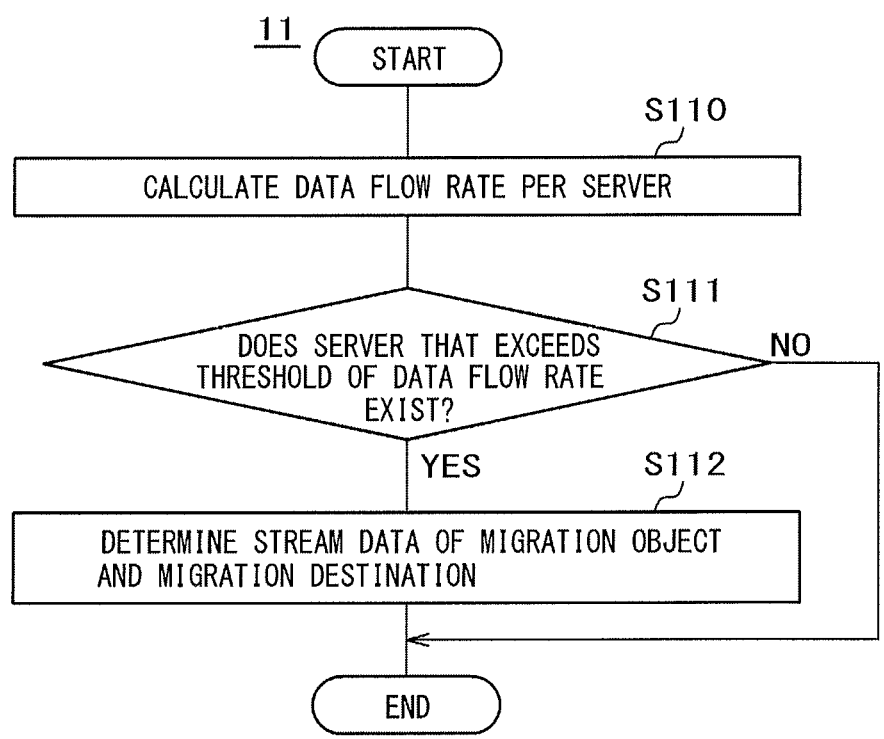

STREAM DATA PROCESSING SYSTEM AND PROCESSING METHOD

TECHNICAL FIELD

The present invention relates to a processing system and a processing method of stream data.

BACKGROUND ART

A method of realizing Scale Out is proposed in which a load of a computer is distributed by newly adding a computer separately from the computer which is executing a query where processing contents are defined and migrating some of queries to the added computer in a stream data processing system.

For example, Patent Literature 1 discloses that a cost required for migration is calculated on the basis of definition information defined by queries, the query to be migrated is selected according to the calculated migration cost and the query is migrated by a preset migration method. For the migration method, a copying method of copying data stored by a stream data processor that executes a query at a migration destination and a warm-up method of transmitting the same stream data to both a migration source and a migration destination until data according to the execution of queries at the migration source and at the migration destination coincide are disclosed.

CITATION LIST

Patent Literature

Patent Literature 1: Japanese Patent Application Publication No. 2010-1400357

SUMMARY OF INVENTION

Technical Problem

In the copying method which is the migration method disclosed in Patent Literature 1, the input of new stream data to the stream data processor is required to be temporarily halted during copying data stored by the stream data processor at the migration destination and a real time property is impaired. Further, unless the stream data the input of which is temporarily halted is stored, the stream data the input of which is halted may be lost.

In the warm-up method, there is a case where data according to the execution of queries at the migration source and at the migration destination do not coincide for long time. For an extreme example, in a case where stream data to be migrated is input at an interval of one hour, the data do not coincide at least for one hour and depending upon a case, the data may not coincide for hours.

Then, a situation where data do not coincide for long time is required to be prevented from occurring without losing data according to the execution of queries at the migration source and at the migration destination, that is, migration time is required to be reduced.

Solution to Problem

A disclosed stream data processing system is provided with an input server that accumulates input stream data to be migrated in response to an instruction to migrate including information for specifying the input stream data to be migrated and a migration destination server which processes the input stream data, instructs a migration source server and the migration destination server to migrate the input stream data to be migrated, transfers the accumulated input stream data to be migrated to the migration destination server in response to an instruction to transfer the accumulated data from the migration destination server, stops the transfer of the input stream data to be migrated to the migration source server in response to the completion of the transfer of the accumulated input stream data to be migrated to the migration destination server, and starts the transfer of input stream data to be migrated following the accumulated input stream data to be migrated to the migration destination server, the migration source server that migrates an intermediate value as a result of the completion of the execution of the query corresponding to the input of a query and data as an object of the query to the migration destination server according to the completion of the execution of the query corresponding to the input of data including the input stream data to be migrated according to the query where processing contents for processing the input stream data of the migration object which is transferred from the input server are defined in response to the instruction to migrate the input stream data to be migrated from the input server, stops the execution of the query in response to an instruction to stop the execution of the query from the migration destination server, and transfers an execution result of the query to the migration destination server, and the migration destination server that starts the execution of the query migrated from the migration source server in response to the instruction to migrate the input stream data to be migrated from the input server, outputs the instruction to transfer the accumulated data to the input server, skips up to data corresponding to the intermediate value in the accumulated input stream data and the following input stream data to be migrated respectively transferred from the input serer, and nullifies the output of an execution result of the query up to the execution result of the query transferred from the migration source server.

Advantageous Effects of Invention

According to the disclosed stream data processing system, migration time can be reduced.

BRIEF DESCRIPTION OF DRAWINGS

FIG. 11 A flowchart showing a process of a migration determination unit.

DESCRIPTION OF EMBODIMENTS

Figure 1:
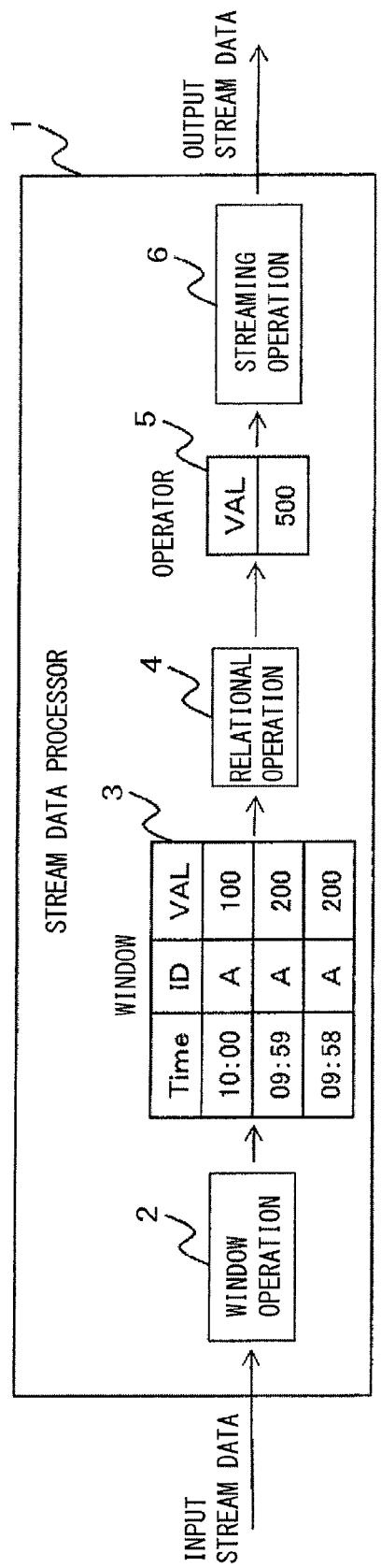
FIG. 1 A schematic diagram showing a stream data processor.
Figure 2:
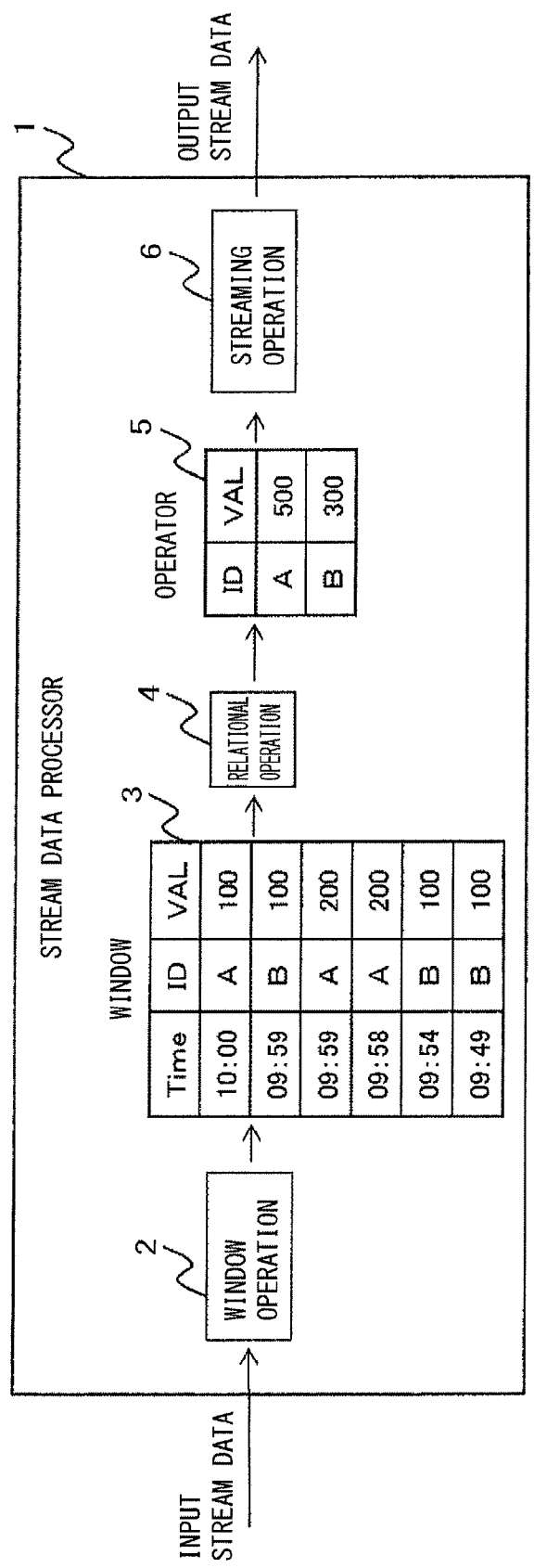
FIG. 2 A schematic diagram showing a stream data processor.

FIGS. 1 and 2 are schematic diagrams showing stream data processors. FIG. 1 shows one example of the stream data processor that executes a query which defines a processing content (also called scenario). According to a query, the stream data processor 1 executes (1) window operation 2 that extracts data to be processed from input stream data and stores the extracted data in a storage area called a window 3, (2) relational operation 4 that applies predetermined operation to the data stored in the window 3 and stores a result of the execution in a storage area called an operator 5 and (3) streaming operation 6 for streaming the data stored in the operator 5 as output stream data.

The window 3 stores generation time (may also be a generation sequential number) of each data of the input stream data, an ID of the data (as described later referring to FIG. 2, plural types of data identified by ID may be included in the input stream data) and a value VAL of the data.

For processing contents defined by a query, a simple example in which the total of the latest three data of the input stream data is calculated will be described below. To avoid intricacy, the data is represented as D (Time, ID, VAL) or is further simplified and is represented as D (Time). Further, the current time shall be 10:00. Moreover, data as a result of the execution of the relational operation 4 is represented as VAL (Time).

The window operation 2 stores D (09:59), D (09:58) and D (09:57) in the window 3 at the time of 09:59, the relational operation 4 acquires VAL (09:59) as a result of the execution, and transfers D (09:57) from the window 3 to a work area. When D (10:00) at the current time 10:00 is input, the window operation 2 extracts D (10:00) from input stream data and stores it in the window 3. As a result, D (10:00), D (09:59), and D (09:58) are stores in the window 3 as shown in FIG. 1.

The relational operation 4 calculates "VAL (09:59)−D (09:57)+D (10:00)=VAL (10:00)" to acquire the total (VAL (10:00)) of the latest three data by differential operation and stores VAL (10:00) which is a result of the calculation in the operator 5. Further, the relational operation 4 transfers D (09:58) from the window 3 to the work area. In this example, one data is transferred to the work area, although there is a case where plural data are transferred to the work area and there is also a case where data which is a result or an intermediate result of the execution of the relational operation 4 is stored in the work area. For example, when the relational operation 4 calculates "VAL (t)=D (t)+D (t−2)+D (t−4)=VAL (t−2)−D (t−6)+D (t)" using data D (t) of "Time=t" for the latest data, VAL (t−2) and D (t−6) are required to be stored in the work area. Immediately preceding processing before is "VAL (t−3)−D (t−7)+D (t−1)=VAL (t−1)", VAL (t−1) is stored in the operator 5, and the reason is that VAL (t−2) may be not stored (VAL (t−1) may be overwritten). In the meantime, there is also a case where there is no data stored in the work area as described later as a case where the latest one data is extracted as a processing object.

The streaming operation 6 outputs VAL (10:00) stored in the operator 5 as output stream data. The output stream data may also be a type of VAL (Time, ID, VAL) like the input stream data.

As described above, the window 3 is defined as a part of the processing contents defined by the query. In the abovementioned example, the number (the number of pieces) of three data is defined. The window 3 in which the number of pieces is defined is called ROWS window. For an example of the definition of another window, a range (time) can be given. For example, data for the latest 10 minutes is defined. In this case, as data is not necessarily periodically input from a viewpoint of the number of data, the number of data is variable. The window 3 in which time is defined is called RANGE window. For an example of the definition of further another window 3, the latest one data may be extracted as a processing object. In this case, the relational operation 4 executes predetermined operation having the latest data stored in the window 3 or the latest data and VAL (Time) of the last execution result as a variable. The window 3 in which the latest one data is defined as a processing object is called NOW window.

FIG. 2 shows one example of the stream data processor 1 that executes a query which defines the same processing content for different stream data. Different points in comparison with FIG. 1 will be mainly described below. The stream data processor 1 shown in FIG. 2 includes plural stream data identified by different IDs as processing objects for which the query which defines the same processing content is to be executed. Accordingly, in the window 3 and the operator 5, predetermined data is stored with the data correlated with ID as shown in FIG. 2. The relational operation 4 applies predetermined operation (for example, the abovementioned differential operation) to the data per ID stored in the window 3 as the processing object. The different plural stream data which are execution objects of the same processing content are the same type of plural sensor data for example in a case where processing contents for these are the same. The window 3 defined so that stream data identified by different IDs as described above are stored is called PARTITION BY window. From a viewpoint of ID, the PARTITION BY window is any of the ROWS window, the RANGE window and the NOW window and the PARTITION BY window is used with it combined with any of these.

A migration process for migrating the stream data processor 1 that processes stream data to be migrated from a server (a migration source server, merely a migration source) that executes the process of the abovementioned stream data processor 1 to another server (a migration destination server, merely a migration destination) will be briefly described below. Migration objects are stream data and a query. For the migration of a query, the same query is defined at a migration destination again or a program acquired by embodying a query at the migration source is copied at the migration destination and has only to be executed.

It is a subject to migrate data to a migration destination in short time without causing the loss of data in a migration process. For the window 3, the four types are described above. For data migration common to the four types, each data (collectively called intermediate value) in a work area used for executing the window 3, the operator 5 and the relational operation 4 is migrated and data to be migrated of input stream data has only to be migrated without loss or duplication.

Then, (1) when a migration process is started, input stream data to be migrated is accumulated, (2) a stream data processor that processes the input stream data to be migrated is duplexed at the migration source (to facilitate understanding, the original stream data processor is called so and a stream data processor added for duplexity is called a new stream data processor), and it is desirable that timing for duplexity at which the new stream data processor also executes processing is taken from immediately after the execution of the relational operation 4 so as to maintain the correspondence of contents of the window 3 and the operator 5 till immediately before the next data is stored in the window 3 by the window operation 2, (3) the new stream data processor executes the relational operation 4, the new stream data processor is stopped at timing (timing at which the contents of the window 3 and the operator 5 correspond) at which a result of the execution (the contents of the operator 5) is acquired and an intermediate value of the stopped new stream data processor is migrated (copied) to the migration destination, (4) the original stream data processor is stopped according to the completion of the migration of the intermediate value and the result of the execution of the relational operation 4 (VAL (Time) in the abovementioned example) stored in the operator 5 in the intermediate value of the stopped original stream data processor is saved in the migration destination, (5) a stream data process is resumed in the migration destination, the accumulated input stream data is input to the stream data processor at the migration destination, at this time, the duplication with the processed input stream data is precluded (the input up to the latest data stored in the window 3 is skipped) and the duplication with the outputted output stream data is precluded (the output stream data outputted by the original stream data processor is not outputted), referring to the result of the execution of the relational operation 4 stored in the operator 5 in the saved intermediate value of the original stream data processor, and (6) according to the completion of the input of the accumulated input stream data to the migration destination, the stream data process for processing the input stream data to be migrated is migrated according to a procedure for inputting the input stream data to the stream data process at the migration destination.

Figure 3:
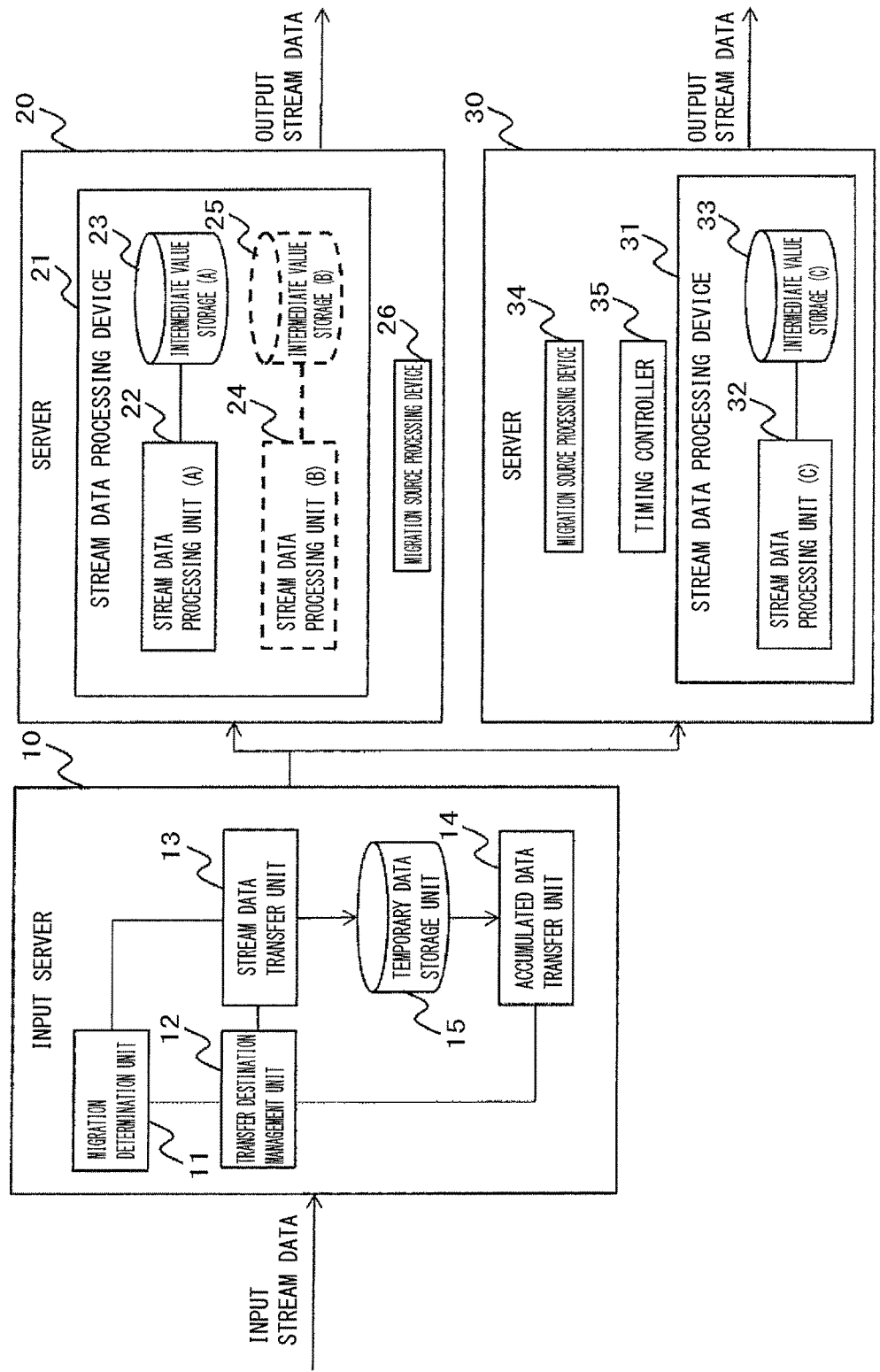
FIG. 3 The configuration of a stream data processing system.

FIG. 3 shows the configuration of a stream data processing system for realizing the execution of the abovementioned procedure. The stream data processing system is provided with servers 20, 30 that execute a stream data process and an input server 10 that allocates input stream data to these servers 20, 30.

The input server 10 is provided with a migration determination unit 11, a transfer destination management unit 12, a stream data transfer unit 13, an accumulated data transfer unit 14 and a temporary data storage unit 15 that temporarily accumulates input stream data.

The migration determination unit 11 determines whether the stream data process for executing a query is to be migrated or not and what input stream data is an object (migration object data) when the process is migrated. The details of processing by the migration determination unit 11 will be described later.

The transfer destination management unit 12 allocates input stream data to the server 20 or 30 that executes the stream data process corresponding to ID of the input stream data and instructs the stream data transfer unit 13 to accumulate the input stream data in the temporary data storage unit 15 according to a stream data processor migration process. Further, the transfer destination management unit 12 instructs the accumulated data transfer unit 14 to transfer the input stream data accumulated in the temporary data storage unit 15.

The stream data transfer unit 13 executes the allocation of the input stream data and the accumulation of the input stream data in the temporary data storage unit 15 corresponding to the instruction from the transfer destination management unit 12.

The accumulated data transfer unit 14 transfers the input stream data accumulated in the temporary data storage unit 15 to the server 30 in response to the instruction from the transfer destination management unit 12 (in this case, the stream data process shall be migrated from the server 20 to the server 30).

The server 20 is described as a server of the migration source of the stream data process in this case. The server 20 is provided with a stream data processing device 21 that processes the input stream data transferred from the input server 10 and a migration source processing device 26 that executes processing for migrating the stream data process to the server 30.

The stream data processing device 21 is provided with a stream data processing unit (A) 22 (the abovementioned original stream data processor), an intermediate value storage (A) 23 that stores an intermediate value by the stream data processing unit (A) 22, a stream data processing unit (B) 24 (the abovementioned new stream data processor) and an intermediate value storage (B) 25 that stores an intermediate value by the stream data processing unit (B) 24. The stream data processing unit (B) 24 and the intermediate value storage (B) 25 are acquired by copying the intermediate value storage (A) that stores the intermediate value by the stream data processing unit (A) 22 as described above. Depending upon an executed query, the capacity of the intermediate value storage (A) may be great and in such a case, since copying processing can be executed in short time by using a snapshot copy, the timing for duplexity can be kept without hindering the execution of the stream data processing unit (A) 22. In FIG. 3, the stream data processing unit (A) 22 that executes the stream data process to be migrated is shown and another stream data processing unit that executes the stream data process which is not the migration object is not shown.

The server 30 is described as a server of the migration destination of the stream data process in this case. In FIG. 3, a stream data processing device (A) 31 that executes the migrated stream data process is shown and another stream data processing device that executes a stream data process originally existing in the server 30 is not shown. The server 30 is provided with a stream data processing unit 32 that processes the migrated input stream data, a migration destination processing device 34 that executes the stream data processor migration process from the server 20 and a timing controller 35 that controls the stream data processing unit 32 so as to preclude the duplication due to migration of input stream data and output stream data.

The details of the migration source processing device 26, the migration destination processing device 34 and the timing controller 35 will be described later. To avoid the intricacy of FIG. 3, a storage area in the migration destination in which the result of the execution of the relational operation 4 stored in the operator 5 in the intermediate value storage (A) 23 for the abovementioned stopped stream data processing unit (A) 22 is to be saved as well as a table described later are not shown.

Figure 4:
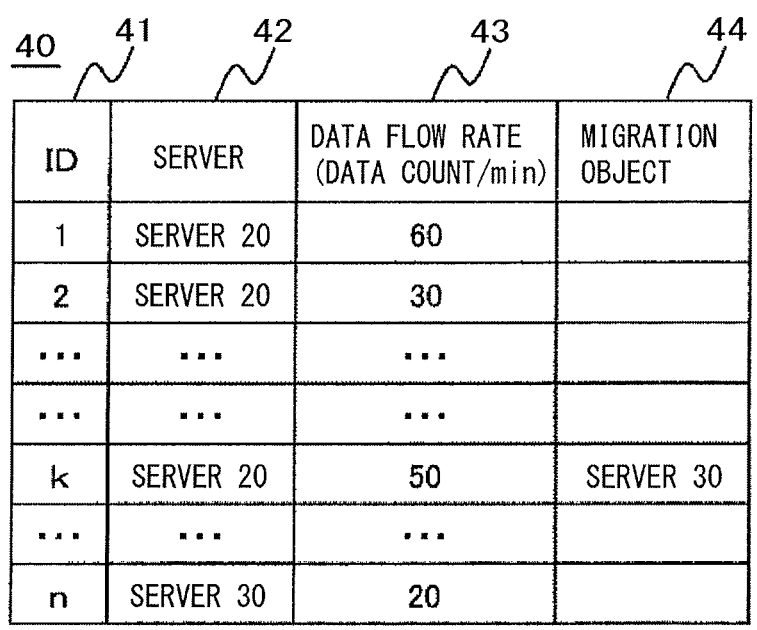
FIG. 4 A data allocation table.

FIG. 4 shows a data allocation table 40 which is not shown in FIG. 3 and with which the input server 10 is provided. The data allocation table 40 includes fields of a server 42 that executes the stream data process (in the table, the server 20 or 30 shown in FIG. 3 is written), a data flow rate 43 and a migration object 44 respectively corresponding to ID 41 allocated to the input stream data. The data flow rate 43 is written in units of a data count/min in FIG. 4, but bps (bits per second) and the like may also be used for a unit. The data flow rate 43 is an item to be a criterion described later when the migration determination unit 11 determines a migration object and is not required to be strict. Accordingly, in the case of the RANGE window, a mean value, a theoretical value and others may also be used.

The migration object 44 functions as a flag. The migration object is set along with the determination of the migration object by the migration determination unit 11 and is deleted along with the completion of the migration process. The reason why the server 30 as the migration destination is written in a field of the migration object 44 in place of a flag for the stream data process for processing input stream data having ID 41 of "k" in FIG. 4 is that plural servers to be selected exist at the migration destination differently from the example shown in FIG. 3 and the migration destination server is specified.

In this specification, both input stream data the ID of which is specified as shown in FIG. 4 and plural input stream data the ID of which is unspecified are called input stream data or stream data. It is clarified from context including a qualifier and others whether the corresponding input stream data is input stream data the ID of which is specified or not.

The operation of each processing unit configuring the stream data processing system will be described with the migration process in the center below.

Figure 5:
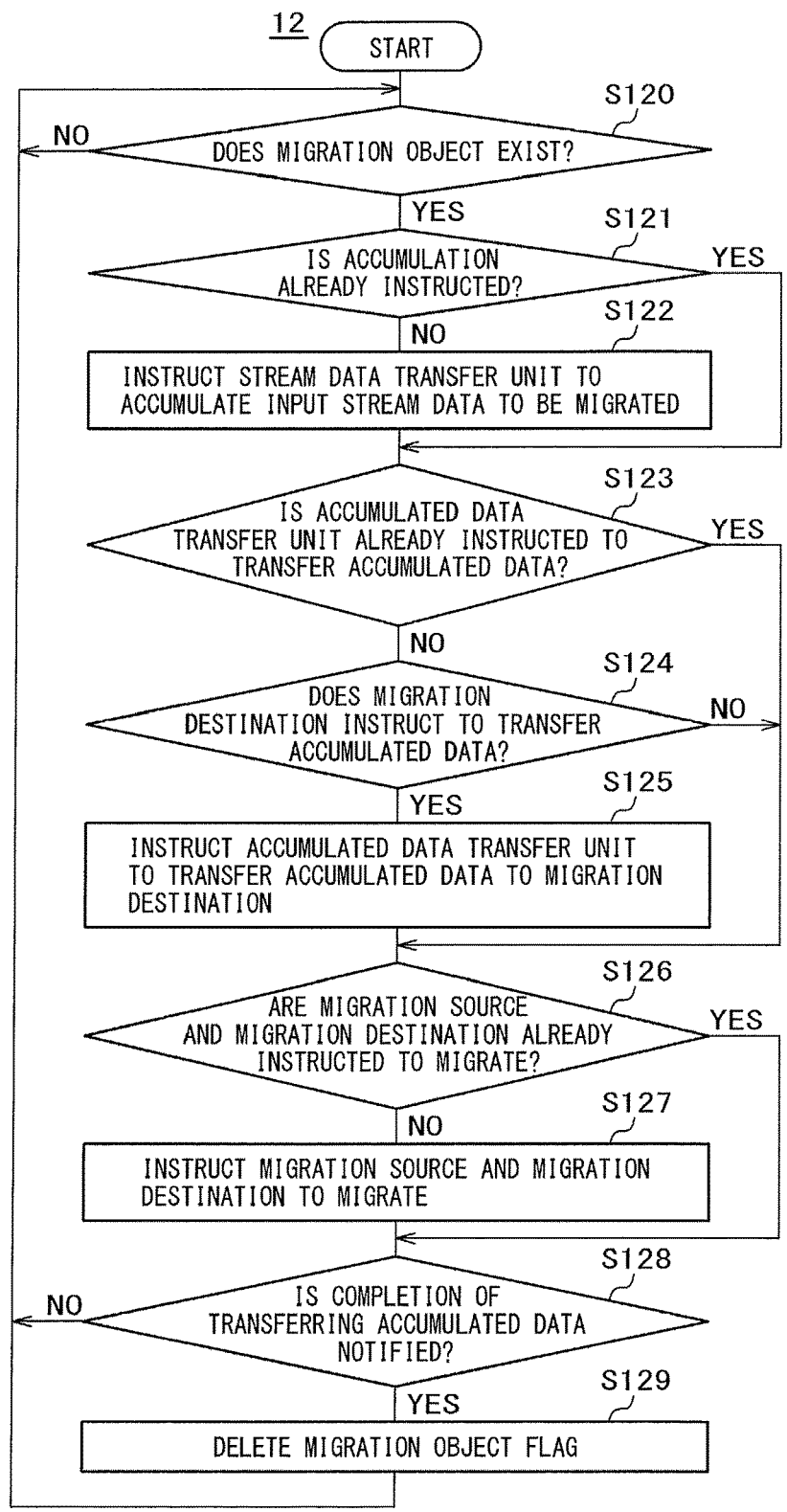
FIG. 5 A flowchart showing a process of a transfer destination management unit.

FIG. 5 is a flowchart showing a process by the transfer destination management unit 12. The transfer destination management unit 12 determines whether input stream data (hereinafter called input stream data of the migration object) to be processed in the stream data process of the migration object exists or not, referring to the field of the migration object 44 (is the migration object flag and an instruction to migrate) in the data allocation table 40 (S120). When no migration object exists, S120 is repeated.

When the migration object exists, the transfer destination management unit 12 determines whether the stream data transfer unit 13 is already instructed to accumulate input stream data to be migrated in the temporary data storage unit 15 (S121). An instruction to accumulate is stored in a predetermined storage area in the input server 10 by the transfer destination management unit 12 and is referred by the stream data transfer unit 13. Accordingly, the transfer destination management unit 12 never dually instructs to accumulate. When the transfer destination management unit 12 already instructs to accumulate, a process flow jumps to S123. When the transfer destination management unit 12 does not instruct to accumulate yet, it instructs the stream data transfer unit 13 to accumulate input stream data to be migrated in the temporary data storage unit 15 (S122).

The transfer destination management unit 12 determines whether it has already instructed the accumulated data transfer unit 14 to transfer the input stream data to be migrated which is accumulated in the temporary data storage unit 15 (the accumulated data) (S123). The instruction to transfer is also stored in the predetermined storage area in the input server 10 by the transfer destination management unit 12 and is referred by the accumulated data transfer unit 14. Accordingly, the transfer destination management unit 12 never dually instructs to transfer the accumulated data. When the transfer destination management unit 12 already instructs to transfer the accumulated data, the process flow jumps to S126. When the transfer destination management unit does not instruct to transfer the accumulated data yet, it determines whether an instruction to transfer the accumulated data the details of which will be described later from the timing controller 35 of the server 30 of a migration destination has been received (S124). The instruction to transfer the accumulated data from the migration destination is also stored in the predetermined storage area in the input server 10. Since the migration destination is the server 30 in the example shown in FIG. 4 and the instruction to transfer the accumulated data is transmitted from the migration destination processing device 35 of the server 30, the input server 10 (a receiving unit not shown) stores the received instruction to transfer the accumulated data in the predetermined storage area in the input server 10. When the transfer destination management unit 12 does not receive the instruction to transfer the accumulated data, the process flow jumps to S126. When the transfer destination management unit 12 receives the instruction to transfer the accumulated data, it instructs the accumulated data transfer unit 14 to transfer the input stream data to be migrated which is accumulated in the temporary data storage unit 15 (S125). The instruction to transfer is also stored in the predetermined storage area in the input server 10 by the transfer destination management unit 12.

The transfer destination management unit 12 determines whether it already instructs the server 20 which is the migration source and the server 30 which is the migration destination to execute a migration process (S126). The instruction to execute the migration process is transferred to the migration source and the migration destination and is stored in the predetermined storage area in the input server 10 by the stream data transfer unit 13. An ID for specifying the stream data to be migrated is included in the instruction to execute the migration process. In the example shown in FIG. 4, an ID is "k". When the transfer destination management unit 12 already instructs to execute the migration process, the process flow jumps to S128. When the transfer destination management unit 12 does not instruct to execute the migration process yet, it transfers the instruction to execute the migration process including an ID for specifying the stream data to be migrated to the server 20 which is the migration source and the server 30 which is the migration destination.

The transfer destination management unit 12 instructs to accumulate the stream data earlier than the instruction to execute the migration process to the migration source and the migration destination so as to prevent loss of the stream data.

The transfer destination management unit 12 determines whether the completion of the transfer of the accumulated data is notified (S128). The notice that the transfer of the accumulated data is completed is also stored in the predetermined storage area in the input server 10 by the stream data transfer unit 13. The reason why the notice that the transfer of the accumulated data is completed is stored not by the accumulated data transfer unit 14 but by the stream data transfer unit 13 will be described later as the description of the stream data transfer unit 13. When the transfer destination management unit 12 is not notified of the completion of the transfer of the accumulated data, the process flow is returned to S120. Since it means the resumption of the transfer to the server 30 which is the migration destination of the input stream data migrated by the stream data transfer unit 13 that the completion of the transfer of the accumulated data is notified, the transfer destination management unit 12 deletes corresponding data (the migration object flag) in the field of the migration object 44 in the data allocation table 40 and deletes the instruction to accumulate, the instruction to transfer the accumulated data, the instruction to transfer the accumulated data from the migration destination, the instruction to execute the migration process to the migration source and the migration destination and the notice that the transfer of the accumulated data is completed which are respectively stored in the predetermined storage area in the input server 10.

As for the notice that the transfer of the accumulated data is completed, the deletion by the transfer destination management unit 12 and the storage by the stream data transfer unit 13 for example are required to be exclusively controlled; however, since the exclusive control is not the essence of the operation in this embodiment, the description is omitted.

Figure 6:
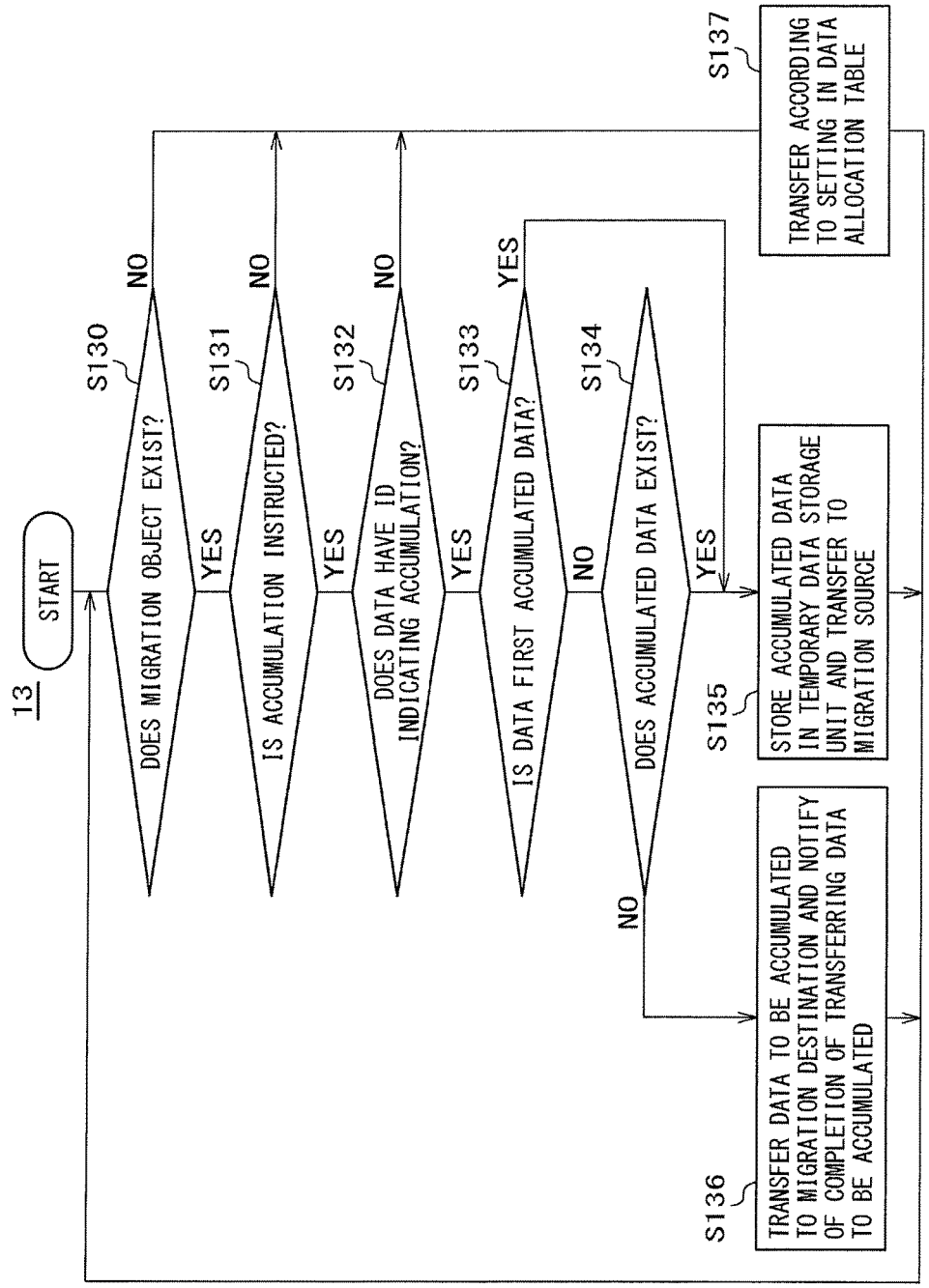
FIG. 6 A flowchart showing a process of a stream data transfer unit.

FIG. 6 is a flowchart showing a process by the stream data transfer unit 13. The stream data transfer unit 13 determines whether input stream data to be migrated and to be processed in the stream data process exists or not, referring to the migration object 44 in the data allocation table 40 (S130). When no migration object exists, the processing of the stream data transfer unit 13 proceeds to S137. S137 is a normal step for transferring input stream data to the server 20 or the server 30 according to setting in the data allocation table 40.

When the migration object exists, the stream data transfer unit 13 determines whether the instruction to accumulate stored in the predetermined storage area in the input server 10 by the transfer destination management unit 12 exists (S131). When no instruction to accumulate exists, the processing of the stream data transfer unit 13 proceeds to S137.

When the migration object exists, the stream data transfer unit 13 determines whether the instruction to accumulate stored in the predetermined storage area in the input server 10 by the transfer destination management unit 12 exists (S131). When no instruction to accumulate exists, the processing of the stream data transfer unit 13 proceeds to S137.

When the instruction to accumulate exists, the stream data transfer unit 13 determines whether the input stream data is data having ID indicating that the input stream data is to be accumulated or not, referring to the field of the ID 41 in the data allocation table 40 (S132). When the input stream data does not have ID indicating accumulation, the processing of the stream data transfer unit 13 proceeds to S137. When the input stream data has ID indicating accumulation, the stream data transfer unit 13 determines whether the input stream data is first accumulated data (S133). When the input stream data is not the first accumulated data, the processing of the stream data transfer unit 13 proceeds to S135.

The stream data transfer unit 13 determines whether accumulated data exists in the temporary data storage unit 15 (S134). When accumulated data exists in the temporary data storage unit 15, the stream data transfer unit 13 stores data having ID indicating that the data is to be accumulated in the temporary data storage unit 15 (S135). When no accumulated data exists in the temporary data storage unit 15, the stream data transfer unit transfers the input stream data to the server 30 of the migration destination without storing the data having the ID indicating that the data is to be accumulated in the temporary data storage unit 15 and stores notice that the transfer of accumulated data is completed in the predetermined storage area in the input server 10 (S136).

The processing in S133 to S136 will be described plainly below. Data is stored and extracted in the temporary data storage unit 15 according to first-in first-out (FIFO). When data is extracted, the data is deleted from the temporary data storage unit 15. When the accumulated data transfer unit 14 detects the completion of the transfer of accumulated data while such a storage is used, a state occurs in which the stream data transfer unit 13 stores new accumulated data in the temporary data storage unit 15 immediately after the accumulated data transfer unit 14 detects the completion of the transfer of the accumulated data (a state in which no accumulated data exists in the temporary data storage unit 15). To prevent the occurrence of this state, the stream data transfer unit 13 detects the completion of the transfer of accumulated data. However, a state in which no accumulated data exists in the temporary data storage unit 15 occurs till immediately before the initiation of accumulation and immediately after the completion of the transfer of accumulated data to the migration destination. Then, in the case of first accumulated data, input stream data is accumulated in the temporary data storage unit 15 independent of whether accumulated data exists in the temporary data storage unit 15 or not. Accordingly, the state in which no accumulated data exists in the temporary data storage unit 15 is there only after time at which the transfer of accumulated data to the migration destination is completed.

Figure 7:
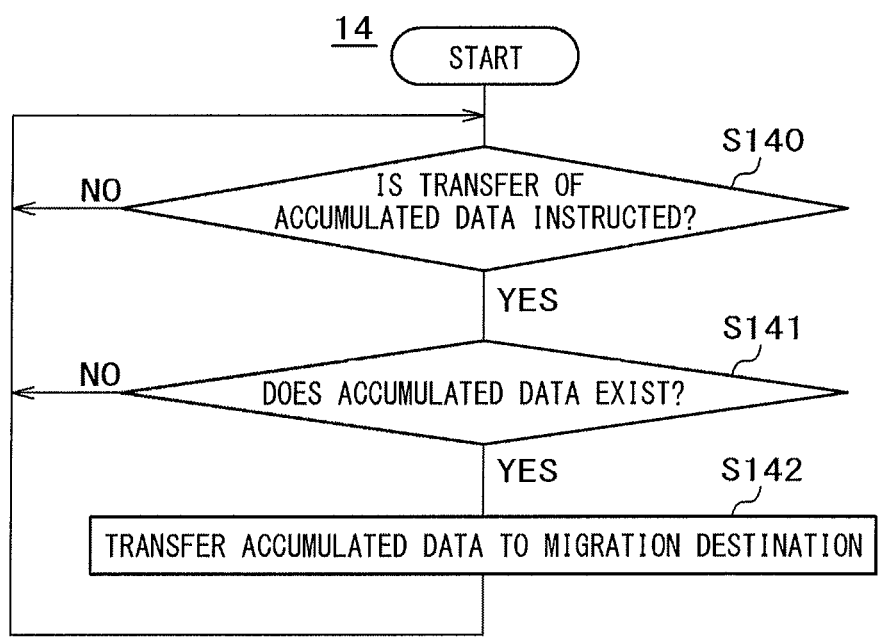
FIG. 7 A flowchart showing a process of an accumulated data transfer unit.

FIG. 7 is a flowchart showing a process by the accumulated data transfer unit 14. The accumulated data transfer unit 14 determines whether an instruction to transfer accumulated data which is stored in the predetermined storage area in the input server 10 by the transfer destination management unit 12 is issued (S140). When no instruction to transfer accumulated data is issued, the accumulated data transfer unit 14 repeats the processing in S140.

When an instruction to transfer accumulated data is issued, the accumulated data transfer unit 14 determines whether input stream data to be migrated (accumulated data) exists in the temporary data storage unit 15 (S141). When no accumulated data exists, the processing of the accumulated data transfer unit 14 proceeds to S140. The accumulated data transfer unit 14 sequentially transfers accumulated data stored in the temporary data storage unit 15 to the server 30 of the migration destination (S142) and the processing proceeds to S140.

When no instruction to transfer accumulated data is issued, the processing of the accumulated data transfer unit 14 may also be terminated. However, in that case, the transfer destination management unit 12 is required to activate the accumulated data transfer unit 14 when the transfer destination management unit instructs to transfer accumulated data.

Figure 8:
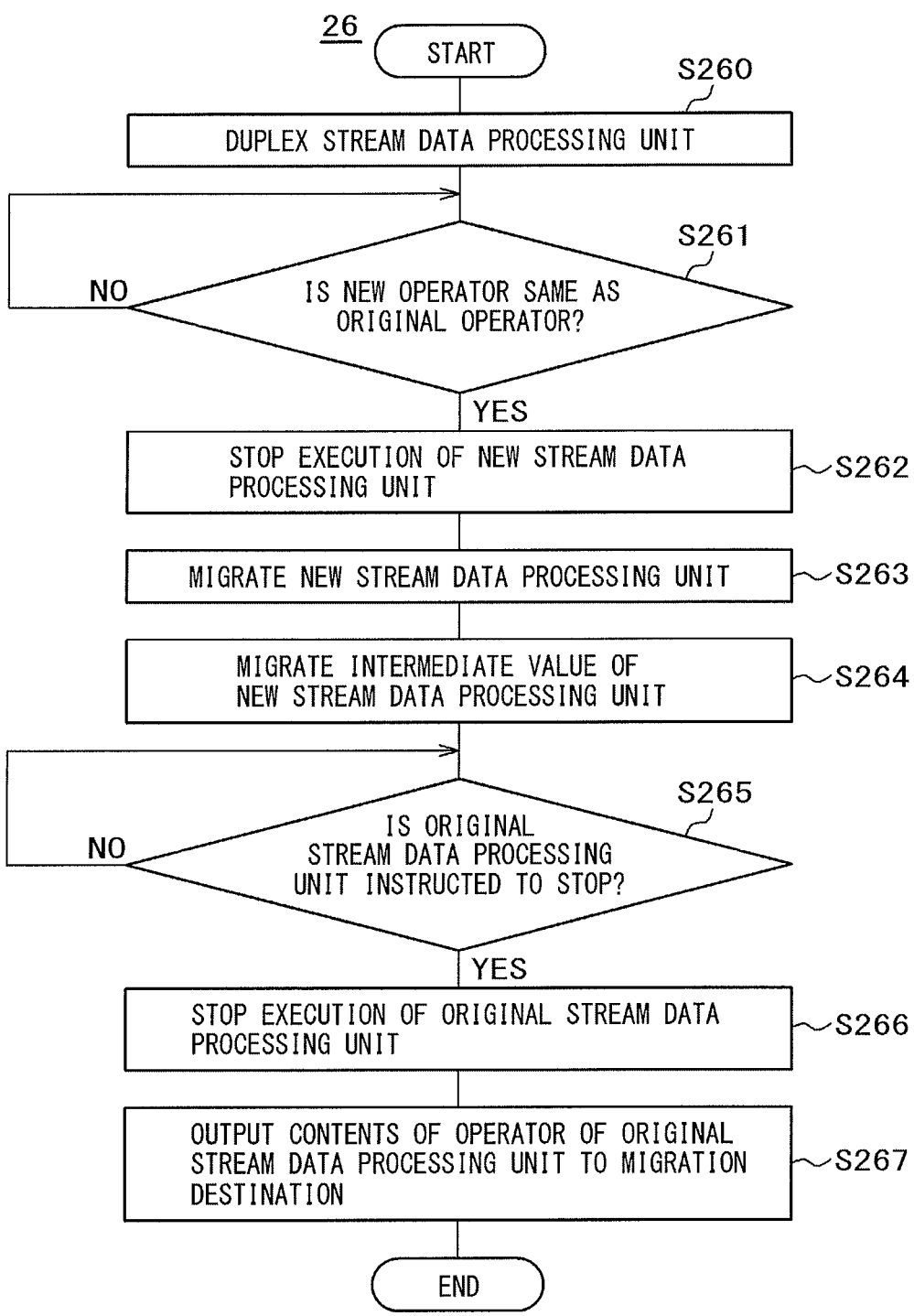
FIG. 8 A flowchart showing a process of a migration source processing device.

FIG. 8 is a flowchart showing a process by the migration source processing device 26 of the server 20 of the migration source. The migration source processing device 26 is activated in response to an instruction to migrate from the transfer destination management unit 12 (S127 shown in FIG. 7).

The migration source processing device 26 duplexes the stream data processing device 21 in the server 20 of the migration source (S260). Concretely, the stream data processing unit (A) 22 is copied so as to generate the stream data processing unit (B) 24, and the intermediate value storage (A) 23 is copied so as to generate the intermediate value storage (B) 25 as shown in FIG. 3. Though it is not shown in the drawing, the generated stream data processing unit (B) 24 is instructed to execute. A method of generating these and generation timing are as described above.

The migration source processing device 26 determines whether contents of the operator 5 included in the intermediate value storage (B) 25 for the stream data processing unit (B) 24 which is a new stream data processing unit are the same as the contents of the operator 5 included in the intermediate value storage (A) 23 for the stream data processing unit (A) 22 which is an original stream data processing unit (S261). Since new stream data may be input to the stream data processing unit (A) 22 during copying processing in S260 (before the execution of the stream data processing unit (B) 24 is started), the migration source processing device determines the contents of the operator 5. When an input interval of input stream data to be migrated is longer, compared with copying processing time, the contents of the operators 5 are the same, and when an input interval is shorter, the contents of the operators 5 may be different. To reduce the possibility, a snapshot copy may also be used. This determination is made to reflect a possibly new state of the migration source at the migration destination and as the similar state (a state in which the contents of the operators 5 in the migration source and in the migration destination are different) also occurs during migration processing described later, the determination is not necessarily required processing.

The migration source processing device 26 stops the execution of the stream data processing unit (B) 24 which is a new stream data processing unit (S262). Since time from immediately after the execution of the relational operation 4 till immediately before the next data is stored in the window 3 by the window operation 2 is desired so as to maintain correspondence between the window 3 and the contents of the operator 5 as described above, timing for stopping the execution shall be immediately after the execution of the relational operation 4.

The migration source processing device 26 migrates the stopped stream data processing unit (B) 24 to the server 30 of the migration destination (S263). For a method of the migration, the processing unit is copied in the migration destination or a new processing unit has only to be generated in the migration destination as described above. The migration source processing device 26 migrates the intermediate value storage (B) 25 to the server 30 of the migration destination (S264).

The migration source processing device 26 waits for an instruction to stop the stream data processing unit (A) 22 which is the original stream data processing unit (S265). The instruction to stop is output from the timing controller 35 described later and is output at timing at which preparation for resuming the migrated stream data process is completed in the migration destination.

The migration source processing device 26 stops the execution of the stream data processing unit (A) 22 which is the original stream data processing unit when the migration source processing device receives the instruction to stop the stream data processing unit (A) 22 (S266). Timing for stopping the execution shall also be immediately after the execution of the relational operation 4 in the stream data processing unit (A) 22.

The migration source processing device 26 outputs the contents of the operator 5 which is a result of the execution of the relational operation 4 in the stream data processing unit (A) 22 to the migration destination (S267). The reason is that there is possibility that the stream data processing unit (A) 22 processes new input stream data during migration processing like the abovementioned copying processing and updates the contents of the operator 5.

Figure 9:
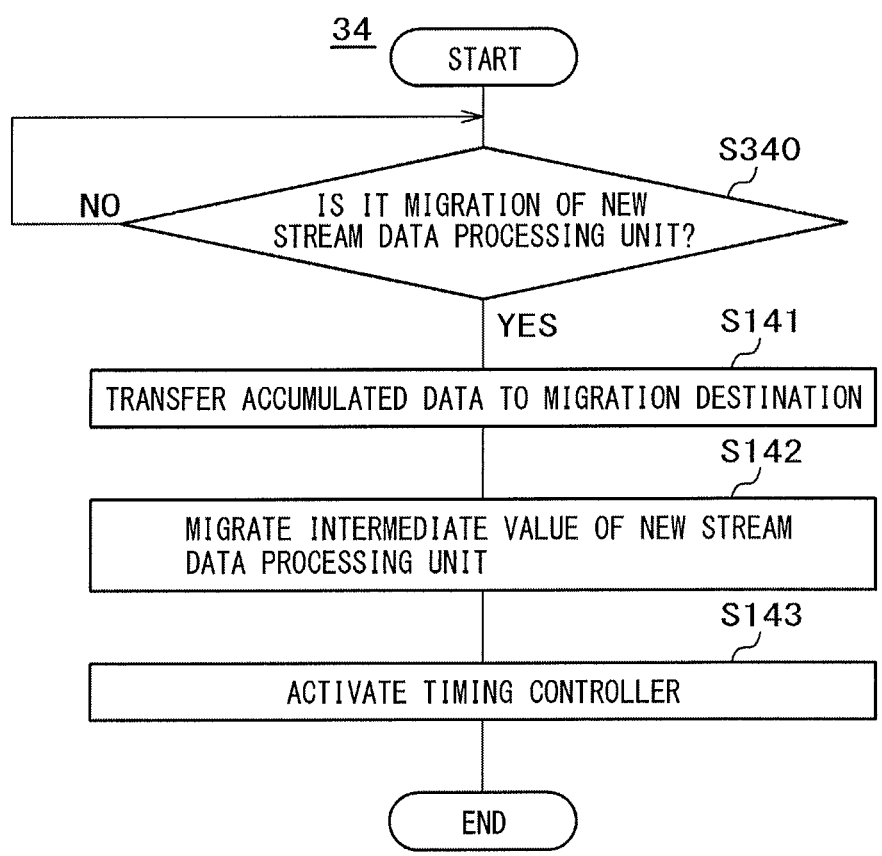
FIG. 9 A flowchart showing a process of a migration destination processing device.

FIG. 9 is a flowchart showing a process of the migration destination processing device 34 in the server 30 of the migration destination. The migration destination processing device 34 is activated in response to an instruction to migrate from the transfer destination management unit 12 (S127 shown in FIG. 7).

The migration destination processing device 34 waits for the migration of the stream data processing unit (B) 24 from the migration source (S340), migrates the stream data processing unit (B) 24 from the server 20 of the migration source, and sets it as a stream data processing unit (C) 32 (S341). For a method of the migration, it suffices that the processing unit is copied in the migration destination or a new processing unit is generated in the migration destination as described above.

The migration destination processing device 34 migrates the intermediate value storage (B) 25 from the server 20 of the migration source and sets it as an intermediate value storage (C) 33 (S342). The migration destination processing device 34 activates the timing controller 35 (S343) and terminates the process.

As described above, since there is the possibility that the stream data processing unit (A) 22 processes new input stream data and updates the contents of the operator 5 during migration processing, the stream data processing unit (C) 32 and the intermediate value storage (C) 33 may also be generated (migrated) on the basis of the stream data processing unit (A) 22 and the intermediate value storage (A) 23 without duplexing the stream data processing unit by the migration source processing device 26, that is, without generating the stream data processing unit (B) 24 and the intermediate value storage (B) 25 if correspondence with the update of the contents of the operator 5 is enabled (a method of corresponding will be described later in the description of the timing controller 35).

The reason for the processing via the stream data processing unit (B) 24 and the intermediate value storage (B) 25 is that communication between servers is required to migrate from the server 20 of the migration source to the server 30 of the migration destination and a difference in progress of processing between the stream data processing unit (A) 22 and the stream data processing unit (C) 32 increases because the communication between servers requires longer processing time than copying in the server. Since the difference in the progress of the processing is equivalent to the above-mentioned update (an update frequency) of the contents of the operator 5, correspondence with the update has only to be enabled. Further, to reduce the difference in the progress of the processing, a snap shot copy may also be used though it cannot be guaranteed that the difference is eliminated.

Figure 10:
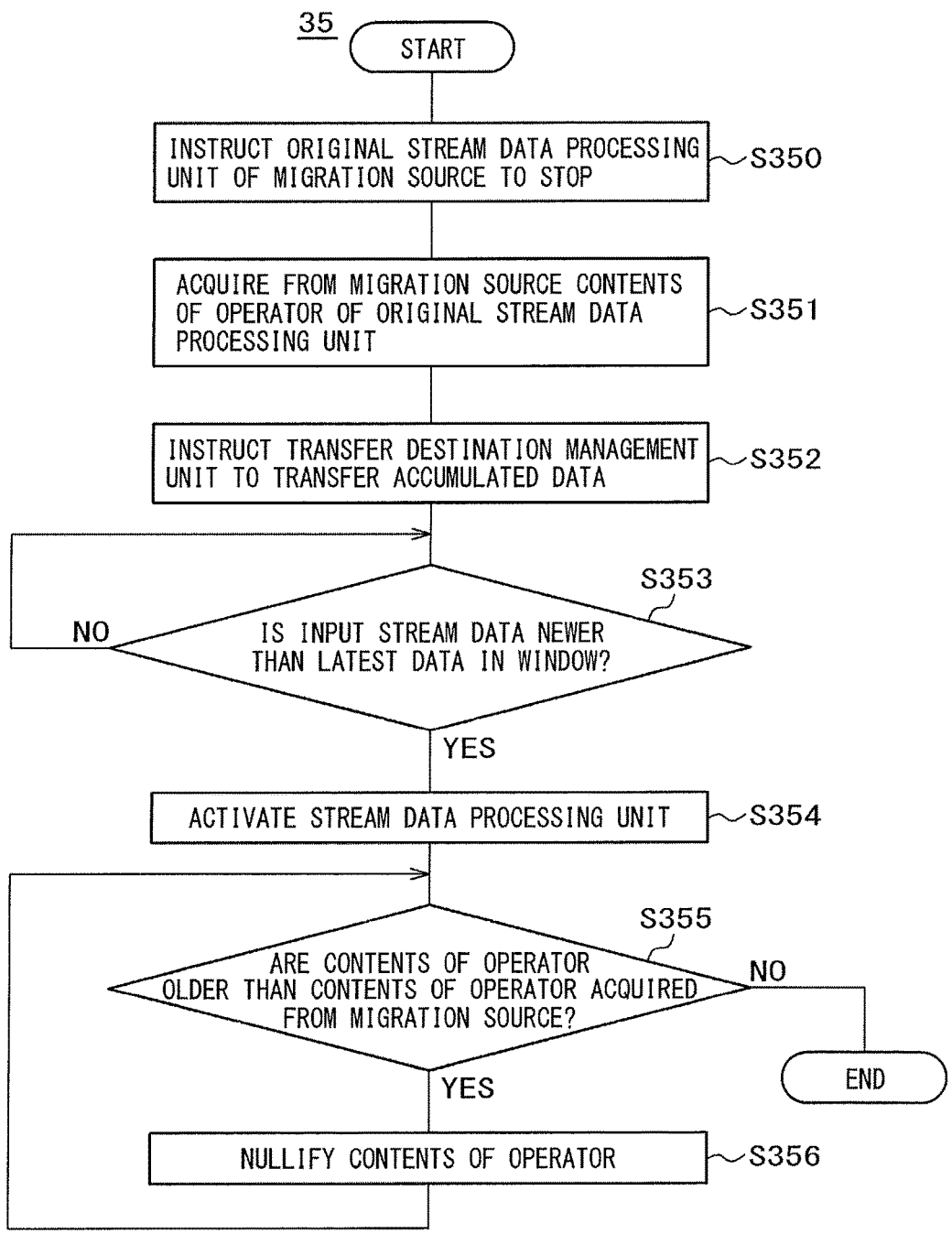
FIG. 10 A flowchart showing a process of a timing controller.

FIG. 10 is a flowchart showing a process of the timing controller 35 in the server 30 of the migration destination. The timing controller 35 is activated according to the completion of generating (migrating) the stream data processing unit (C) 32 and the intermediate value storage (C) 33 by the migration destination processing device 34.

The timing controller 35 instructs the stream data processing unit (A) 22 which is the original stream data processing unit during execution in the server 20 of the migration source to stop (S350).

The timing controller 35 acquires the contents of the operator 5 (output by the migration source processing device 26 in S267) which is an execution result of the relational operation 4 in the stream data processing unit (A) 22 from the server 20 of the migration source (S351) and stores them in a predetermined work area in the server 30.

The timing controller 35 instructs the transfer destination management unit 12 to transfer accumulated data (S352). The timing controller 35 waits for the input of newer data than the latest data stored in the window 3 in the intermediate value storage (C) 33 (S353). Since the stream data processing unit (C) 32 processes up to the latest data stored in the window 3, the timing controller waits for newer data than it. In other words, the timing controller skips up to the latest data stored in the window 3. The duplication of input stream data, that is, the duplication of processing of the stream data processing unit (C) 32 having the same input stream data as a processing object can be avoided by this skip.

The timing controller 35 activates the stream data processing unit (C) 32 when newer data than the latest data stored in the window 3 is input to the timing controller (S354). Although the contents of the operator 5 are updated according to the execution of the stream data processing unit (C) 32, the timing controller 35 determines whether the contents of the operator 5 are older than the contents of the operator 5 (the execution result of the stream data processing unit (A)) stored in the predetermined work area in the server 30 (S355) and nullifies the contents of the operator 5 acquired as a result of the execution of the stream data processing unit (C) 32 when the contents of the operator are older. Concretely, the contents of the operator 5 are prevented from being output as output stream data.

The timing controller 35 terminates the process when the contents of the operator 5 acquired according to the execution of the stream data processing unit (C) 32 temporally exceeds the contents of the operator 5 stored in the predetermined work area in the server 30.

As described above, the duplication of output stream data, that is, the duplication of output data of the stream data processing unit (C) 32 having the same input stream data as a processing object can be avoided by comparing the contents of the operator 5 acquired according to the execution of the stream data processing unit (C) 32 with the contents of the operator 5 acquired according to the execution of the stream data processing unit (A) and nullifying the data (the contents of the operator 5).

The timing controller 35 uses time data in the field of VAL (Time) in the abovementioned D (Time) for judgement that the contents of the operator are older and they exceed temporally.

The stream data processing system that specifies an ID of input stream data and migrates the stream data process has been described above. The stream data process that executes the same query for input stream data having plural IDs as a processing object and corresponds to individual ID in a window frame partitioned by PARTITION BY window can be migrated by specifying an ID. Further, in the cases of ROW window, RANGE window and NOW window, since an ID of input stream data corresponds to a query by 1 to 1, the stream data process can also be migrated by specifying the query.

Further, the stream data process can also be migrated by specifying a query for a window frame for which the same query is executed and which is partitioned by PARTITION BY window out of input stream data having plural IDs as a processing object. The reason is that plural IDs for which the same query is executed are set and each processing unit explained for each ID as the migration object 44 in the data allocation table 40 shown in FIG. 4 has only to be executed.

Next, the stream data process will be described from a viewpoint of the necessity of migration. The migration of the stream data process is executed to prevent an excessive load of a server that executes the stream data process. Generally, since a server that executes a stream data process is seldom configured to also simultaneously execute another process, a part of load that is excessive for the server has only to be migrated to another server according to the execution of the stream data process. For example, in a stream data processing system in which one server executes a stream data process, a new server (having no load) is added if a load of the server is excessive and a part of a load is migrated to the added server. In a stream data processing system where each server executes a stream data process in which input stream data is distributed between/among plural servers, the server with an excessive load is detected and a part of the load of the detected server is migrated to another server.

A load of a server is generally measured with a CPU usage rate of the server, and if the CPU usage rate is equal to or exceeds a predetermined threshold, a load of the server is judged excessive. In the stream data processing system, a load can be judged excessive with a data flow rate (a data count/min) per server of input stream data. The reason is that in the stream data process, differential operation is used in the relational operation 4. As clear from the abovementioned example, since differential operation using the contents of the operator 5 which is the last execution result, the latest data stored in the window 3, and data stored in the work area is executed, the intricacy of the relational operation 4 never increases a CPU usage rate, compared with a case where no differential operation is used.

Then, though the following is not referred to in the description of the stream data transfer unit 13, it suffices that a data flow rate is measured corresponding to ID of input stream data in the stream data transfer unit 13 and stored in a field of the data flow rate 43 in the data allocation table 40 (shown in FIG. 4).

FIG. 11 is a flowchart showing a process of the migration determination unit 11 that determines the migration of the stream data process. The migration determination unit 11 calculates a data flow rate to be stored in the field of the data flow rate 43 in the data allocation table 40 per server (S110). The migration determination unit 11 determines whether the server the calculated data flow rate of which exceeds a threshold exists (S111). When no server that exceeds the threshold exists, the migration determination unit 11 terminates a process. When a server that exceeds the threshold exists, the migration determination unit 11 specifies an ID, determines stream data to be migrated, determines the migration destination (server), stores the migration destination (server) which is the determined result in the field of the migration object 44 corresponding to the stream data to be migrated in the data allocation table 40, and terminates the process (S112).

The migration determination unit 11 selects the server the calculated data flow rate of which is the slowest as the migration destination server. The migration destination unit 11 selects second stream data in the order of a faster data flow rate out of stream data input to the server that exceeds the threshold as a migration object.

The reason is that the possibility that a load of the server having the excessive load can be reduced is low when data having a slow data flow rate (a value is small) is migration object data. Further, the reason is that when data having the fastest data flow rate is migration object data, an access frequency of the server of the migration source is reduced, while a data flow rate of the server of the migration destination rises; extremely, in specifying the next migration object data, a data flow rate of the server of the migration destination exceeds the threshold and a phenomenon that migrated data is restored to the original server may occur.

According to the abovementioned embodiment, the duplication of input stream data and the duplication of output stream data are allowed so as to prevent loss of input stream data, most of migration processing is executed and processing for eliminating duplication is executed immediately before the completion of the migration processing, therefore migration time of stream data the migration of which is determined is reduced.

LIST OF REFERENCE SIGNS

1: Stream data processor, 2: Window operation, 3: Window, 4: Relational operation, 5: Operator, 6: Streaming operation, 10: Input server, 11: Migration determination unit, 12: Transfer destination management unit, 13: Stream data transfer unit, 14: Accumulated data transfer unit, 15: Temporary data storage unit, 20, 30: Server, 21, 31: Stream data processing device, 23, 25, 33: Intermediate value storage, 26: Migration source processing device, 34: Migration destination processing device, 35: Timing controller.

The invention claimed is:

1. A stream data processing system, comprising:
an input server that accumulates input stream data to be migrated in response to an instruction to migrate including information for specifying the input stream data to be migrated and a migration destination server which processes the input stream data, instructs a migration source server and the migration destination server to migrate the input stream data to be migrated, transfers the accumulated input stream data to be migrated to the migration destination server in response to an instruction to transfer accumulated data from the migration destination server, stops the transfer of the input stream data to be migrated to the migration source server in response to the completion of the transfer of the accumulated input stream data to be migrated to the migration destination server, and starts the transfer of input stream data to be migrated following the accumulated input stream data to be migrated to the migration destination server;
the migration source server that migrates an intermediate value as a result of the completion of the execution of a query corresponding to the input of the query and data as an object of the query to the migration destination server according to the completion of the execution of the query corresponding to the input of data including the input stream data to be migrated according to the query where processing contents for processing the input stream data to be migrated which is transferred from the input server are defined in response to the instruction to migrate the input stream data to be migrated from the input server, stops the execution of the query in response to an instruction to stop the execution of the query from the migration destination server and transfers an execution result of the query to the migration destination server; and
the migration destination server that starts the execution of the query migrated from the migration source server in response to the instruction to migrate the input stream data to be migrated from the input server, outputs the instruction to transfer the accumulated data to the input server, skips up to data corresponding to the intermediate value in the accumulated input stream data and the following input stream data to be migrated respectively transferred from the input server and nullifies the output of an execution result of the query up to the execution result of the query transferred from the migration source server.

2. The stream data processing system according to claim 1, wherein the execution of the query includes window operation in which data to be processed is extracted from the input stream data and the extracted data is stored in a storage area called a window, relational operation in which predetermined operation is applied to the data stored in the window and a result of the execution is stored in a storage area called operator, and streaming operation in which the data stored in the operator is streamed as output stream data.

3. The stream data processing system according to claim 2, wherein the intermediate value is each data in the window, the operator, and a work area used for executing the relational operation.

4. The stream data processing system according to claim 2, wherein the window where the data to which predetermined operation as the relational operation is applied is stored is any of a ROWS window in which a data count of the input stream data is defined, a RANGE window in which a range of the input stream data is defined, and a NOW window in which the latest data of the input stream data is defined.

5. The stream data processing system according to claim 2, wherein the window provided corresponding to the query is a PARTITION BY window in which a plurality of input stream data identified by an ID are stored.

6. The stream data processing system according to claim 1, wherein the input server sets a server in which a data flow rate of the input stream data to be processed is the slowest as the migration destination server, selects, as input stream data to be migrated, stream data having the second fastest data flow rate out of stream data input to the migration source server that is a server in which a data flow rate of the input stream data to be processed exceeds a threshold, and instructs to migrate the selected stream data.

7. A stream data processing method in a stream data processing system in which an input server, a migration source server and a migration destination server are connected,
wherein the input server:
accumulates input stream data to be migrated in response to an instruction to migrate including information for specifying the input stream data to be migrated and the migration destination server which processes the input stream data;
instructs the migration source server and the migration destination server to migrate the input stream data to be migrated;
transfers the accumulated input stream data to be migrated to the migration destination server in response to an instruction to transfer accumulated data from the migration destination server;
stops the transfer of the input stream data to be migrated to the migration source server in response to the completion of the transfer of the accumulated input stream data to be migrated to the migration destination server; and
starts the transfer of input stream data to be migrated following the accumulated input stream data to be migrated to the migration destination server;
the migration source server:
migrates an intermediate value as a result of the completion of the execution corresponding to the input of a query corresponding to the input of the query and data as an object of the query to the migration destination server according to the completion of the execution corresponding to the input of data including the input stream data to be migrated according to the query where processing contents for processing the input stream data to be migrated which is transferred from the input server are defined in response to the instruction to migrate the input stream data to be migrated from the input server;

stops the execution of the query in response to an instruction to stop the execution of the query from the migration destination server; and transfers an execution result of the query to the migration destination server; and the migration destination server:

starts the execution of the query migrated from the migration source server in response to the instruction to migrate input stream data to be migrated from the input server;

outputs the instruction to transfer the accumulated data to the input server;

skips up to data corresponding to the intermediate value in the accumulated input stream data and the following input stream data to be migrated respectively transferred from the input server; and nullifies the output of an execution result of the query up to the execution result of the query transferred from the migration source server.

8. The stream data processing method according to claim 7, wherein the execution of the query comprises:

window operation in which data to be processed is extracted from input stream data and the extracted data is stored in a storage area called a window;

relational operation in which predetermined operation is applied to the data stored in the window and a result of the execution is stored in a storage area called operator; and streaming operation in which the data stored in the operator is streamed as output stream data.

9. The stream data processing method according to claim 8, wherein the intermediate value is each data in the window, the operator, and a work area used for executing the relational operation.

10. The stream data processing method according to claim 8, wherein:

the window where the data to which predetermined operation as the relational operation is applied is stored is any of a ROWS window in which a data count of the input stream data is defined, a RANGE window in which a data range of the input stream data is defined, and a NOW window in which the latest data of the input stream data is defined.

11. The stream data processing method according to claim 8, wherein the window provided corresponding to the query is a PARTITION BY window in which a plurality of input stream data identified by an ID are stored.

12. The stream data processing method according to claim 7, wherein the input server sets a server in which a data flow rate of the input stream data to be migrated is the slowest as the migration destination server, selects, as input stream data to be migrated, stream data having the second fastest data flow rate out of stream data input to the migration source server that is a server in which a data flow rate of the input stream data to be migrated exceeds a threshold, and instructs to migrate the selected stream data.

* * * * *